Feb. 23, 1932.  C. E. SUMMERS  1,846,283
AIR INLET SYSTEM FOR ENGINES
Filed Feb. 1, 1929  2 Sheets-Sheet 1

Inventor
Caleb E. Summers
By
Blackmore, Spencer & Flick
Attorneys

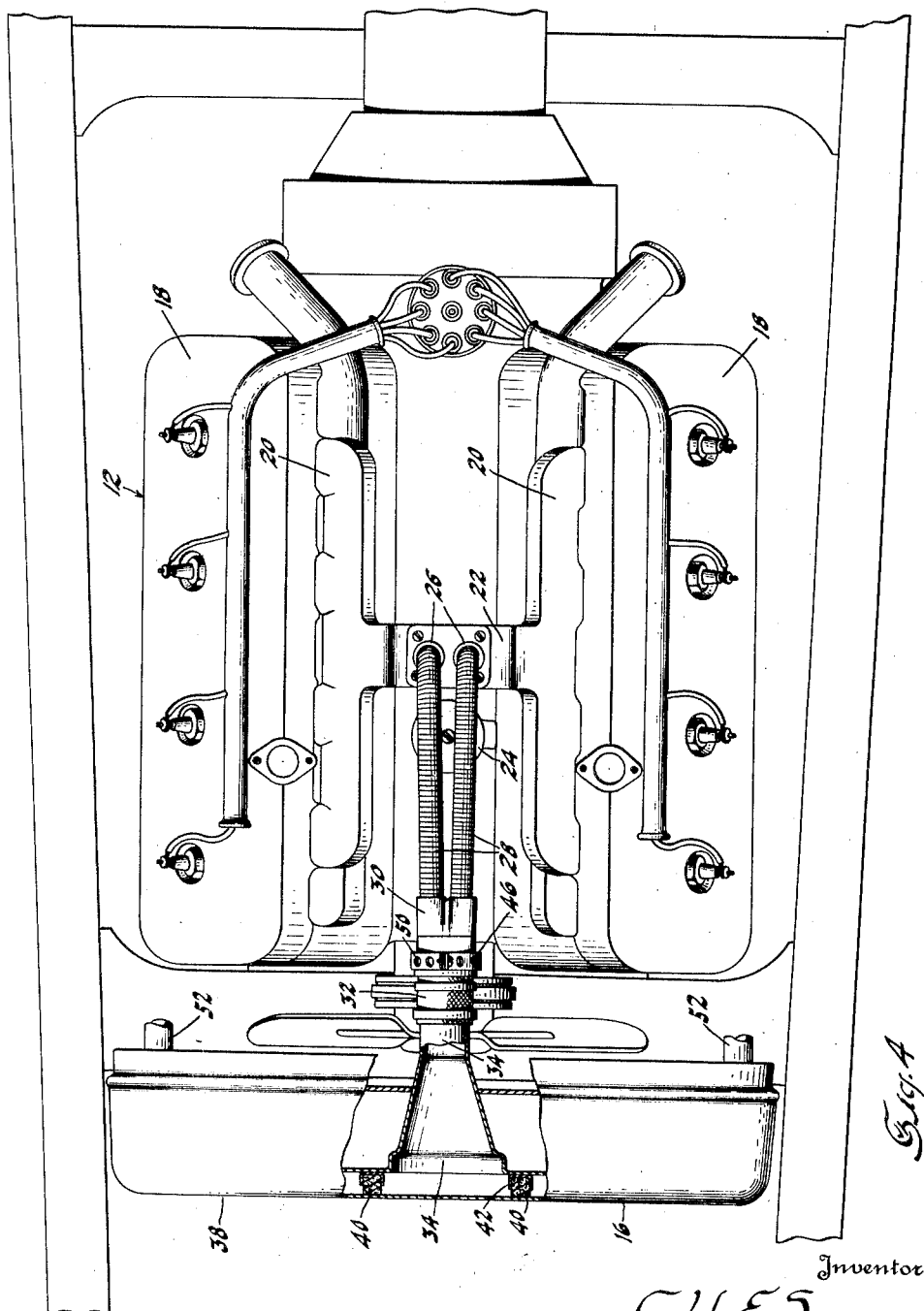

Patented Feb. 23, 1932

1,846,283

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

AIR INLET SYSTEM FOR ENGINES

Application filed February 1, 1929. Serial No. 336,711.

This invention relates to a new system of supplying air to an internal combustion engine. An ideal air supply system should provide the engine with clean, cold air, noiselessly, and preferably in such manner that the ram effect of a long column of air in motion is made use of to insure a maximum charge of fuel.

It is essential that the air be clean so that abrasive particles may not enter the engine and cause undue wear of pistons, cylinders, and bearings. I obtain clean air by arranging the air inlet considerably above the surface of the road where the air is comparatively free of dust, and also arranging it so that the rush of air produced by the motion of the car and usually assisted by the action of the cooling fan, carries the heavy particles of dust past it while the pure air doubles back and enters the inlet.

It is desirable that the air supplied be cold because cold air is more dense and, when mixed with fuel, a given volume will contain more potential heat units, and consequently will develop more power. This is often expressed by saying that greater volumetric efficiency is obtained where the engine is supplied with a cold mixture of fuel than where the mixture is heated. In other words, more power can be obtained from an engine of given displacement supplied with a cold fuel mixture than from the same engine supplied with a heated fuel mixture for the reason that the cold mixture contains more heat units. I achieve this desirable result by arranging my air inlet so that it receives cold air directly from the atmosphere instead of heated air from the hood compartment, or from the car body as is now commonly the case.

Refinement in engine design has made the problem of elimination of noise an important one. The operation of the suction strokes of the engine and the engine valves set up vibrations in the air column entering the engine which often result in noise. I have so located my air inlet that the noise is muffled, and is practically inaudible to occupants of the car.

It is well known that a ram effect is obtainable wherever there is interruption of the flow of a column of fluid through a smooth tube of considerable length. Thus where air is supplied through such a tube to the carburetor and thence to the cylinders of the engine when the piston slows down near the lower end of its stroke, the air in the tube continues in motion owing to its inertia. This creates a relatively higher pressure in the inlet manifold adjacent the valve and forces additional charge into the cylinder just before the valve closes. Thus, each cylinder receives a greater number of potential heat units. This effect will be obtained in certain types of engines, such as that disclosed in this application, and results in increase in power because of the increase in volumetric efficiency. I thus utilize the ram effect in the air intake of the engine to obtain a degree of supercharging.

Other objects and advantages of the invention will appear in the course of the following description.

Referring to the drawings:

Figure 4 is a top plan view taken substantially on line 4—4 of Figure 1.

10 indicates the usual hood compartment of an automobile in which the motor 12 is housed. The compartment is defined as usual by the hood cover 14, the radiator 16, and at the rear end and at the bottom by the cowl and drip pan, respectively, which are not illustrated.

Figure 2:
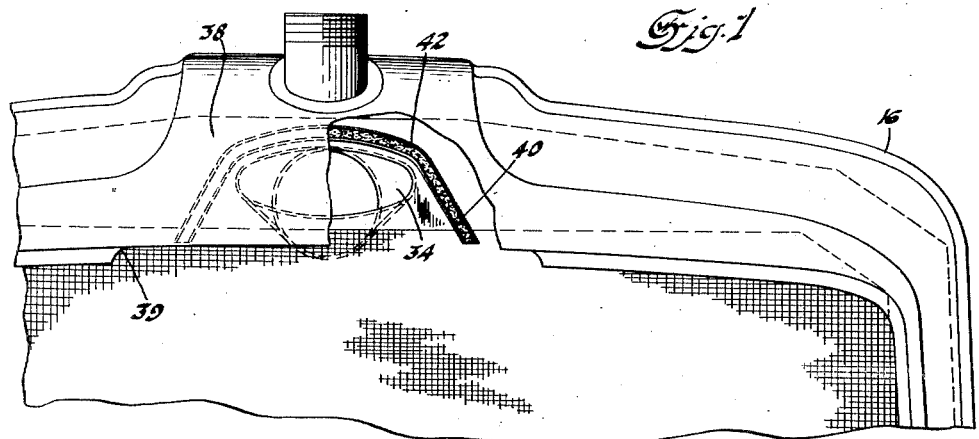
Figure 2 is a view looking at the front of Figure 1 with a part of the radiator and shell broken away.

For purposes of illustration I have shown the engine 12 as of the V type, although my invention is equally applicable to engines having any preferred arrangement of cylinders. The engine comprises two banks of 4 cylinders each, each of the banks being indicated by the reference character 18. The banks are supplied with fuel mixture through intake manifolds 20 arranged on the inner sides of the V, and connected by intake conduit 22. To secure uniformity in distribution of fuel, I preferably make use of carburetor 24 of the duplex type which in effect consists of a single carburetor equipped with two separate fuel mixing chambers. Each of the chambers is provided with a separate air intake 26 connected by long sections 28 of flexible tubing to the Y-coupling 30. The joint between the tubing 28 and the air intakes, are preferably slightly flexible to provide for ready connection of the parts. The coupling 30 is flexibly connected as by a section of hose 32 to the tube 34, which extends through the upper tank 36 of the radiator 16. As is clearly shown in Figure 2, the tube 34 is flattened to an elliptical section in passing through the tank so as to give large air carrying capacity without unduly obstructing the tank. The forward end of the tube 34 is shielded by the upper part 38 of the radiator shell and the adjacent portion of the inturned flange on the shell is cut away at 39 so as to permit the passage of air from in front of the car around the edge of the shell into the passage 34.

I desire that none of the warm air from the hood compartment be permitted to enter the conduit 34, and provide a baffle for this purpose. This baffle preferably takes the form of a piece of felt 40 held in a U-shaped socket 42 and extending from one side to the other of the cut away portion of the flange of the shell.

The operation is as follows: When the car is traveling along, a cooling stream of air is forced through the radiator 16, both as a result of the car's motion, and as a consequence of the action of the cooling fan. Of course, if the car be stationary the stream will result solely from the fan action, and on the other hand, if the car be going at high speed, the entire air flow will be due to the car's motion. The suction of the engine operating through the manifolds 20, conduit 22, tubes 28, coupling 30, and the tube 34 draws a stream of air away from the main stream around the edge of the radiator shell into the open end of the tube 34. This air will be quite clean for the reason that the very much greater inertia of the dust particles will cause the dust to follow a straight line course through the shell. By this arrangement also the air supplied the carburetor will be as cool as can possibly be obtained for it is taken directly from the atmosphere. The considerable length of the tubing 28 leading to each of the fuel mixing passages provides a ram effect which is available to supply a greater quantity of air and fuel to the engine, and consequently increase its volumetric efficiency. This effect can be readily understood by considering that when all of the intake valves are closed, the manifolds 20, conduit 22, and passages 26, 28, and 30, are occupied by a flowing stream of air which owing to its inertia continues to flow and bank up adjacent the cylinders. When now an intake valve is opened the densified mixture is drawn into the combustion chamber providing a greater quantity of heat units than would otherwise be available.

Figure 1:
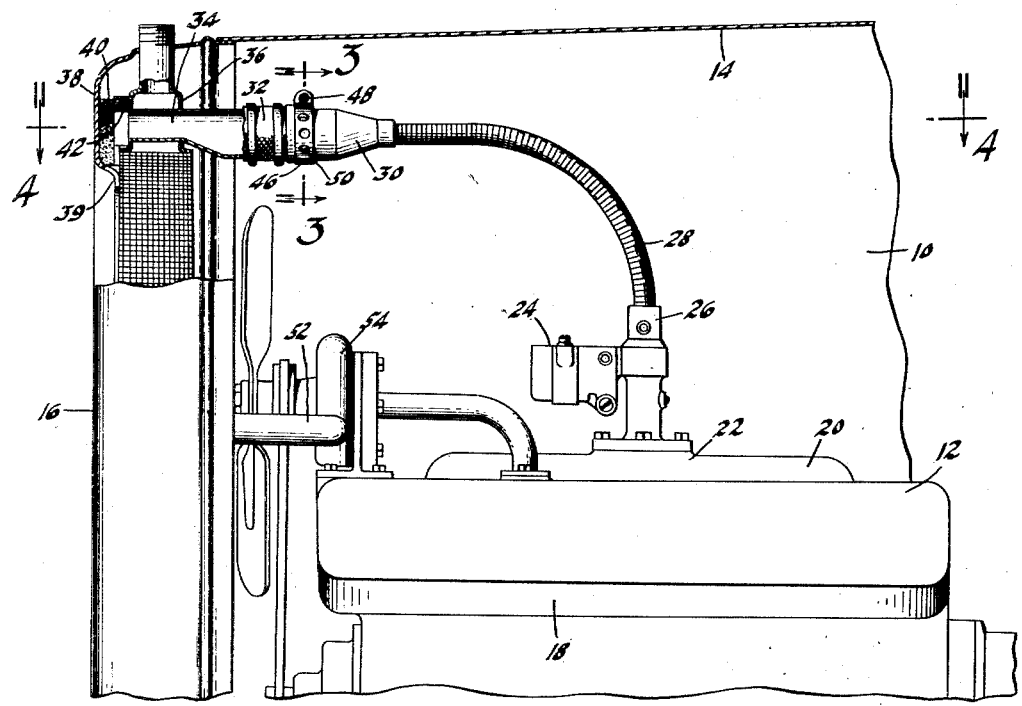
Figure 1 is a side view partly in section showing an engine equipped with my improved air intake system housed within the usual hood compartment.
Figure 3:
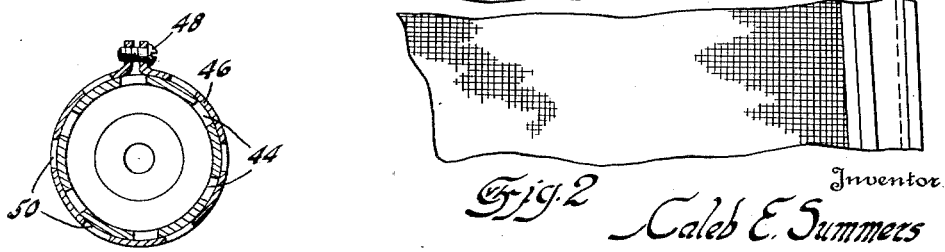
Figure 3 is a section on line 3—3 of Figure 1.

In some cases it may be desirable to admit to the air intake a proportion of heated air from under the hood. I have shown in Figures 1 and 3, a simple means for accomplishing this result. According to this arrangement the fitting 30 is provided with an annular series of apertures 44 and over the apertures is arranged a band 46 which is clamped in place by means of the screw 48. The band is provided with an annular series of apertures 50 corresponding in spacing to the apertures 44. By adjusting the band 46 radially the apertures 50 may be aligned more or less with the apertures 44, and through the aligned apertures air from the hood compartment may enter the engine intake.

My invention is susceptible of a great deal of modification in practice. If desired, the conduit 34 may extend through some other portion of the radiator than the tank 36, it being desirable, however, to locate the intake at a point adjacent the top of the radiator where the air is relatively free of road dust. In some cases it may be found desirable to extend the tubing 34 to the outside of the hood compartment at some other point than at the front of the car. The particular arrangement illustrated is especially convenient where a cross flow radiator is employed as in the case of the engine illustrated, 52 in Figure 1, indicating one of the side hose connections, in this case, conveying cooled water from the radiator 16 to the centrifugal pump 54. However in the case of vertical flow radiators having other arrangements of hose connections some other location of the air intake may be more desirable.

I claim:

1. An automobile provided with an internal combustion engine equipped with an air intake and a radiator, an uninterrupted conduit connected to said air intake and having one end extending through the upper portion of said radiator, and means for shielding said end of the conduit against the direct entrance of air, the other end of the conduit being directly connected to said air intake.

2. An automobile provided with an internal combustion engine having an air intake and a radiator equipped with a shell, a tube leading from the intake to a point adjacent the shell, said shell overlying the intake but being spaced therefrom to shield the latter against the entrance of dust.

3. An automobile comprising an internal combustion engine having an air intake and a radiator including a core having an upper tank and a lower cellular cooling structure and an air supply conduit directly connected to the engine and extending through the tank.

4. An automobile provided with a hood compartment having a radiator at the forward end equipped with an upper tank and a lower cellular cooling structure, an engine within the compartment provided with an air intake, and a conduit extending from the intake through the said tank and open for reception of fresh air at the front of the radiator, said conduit being directly connected to the air intake.

5. An automobile provided with an internal combustion engine having an air intake and with a radiator provided with an upper tank, a shell for the radiator including a part concealing the tank, and a conduit for supplying air to the intake extending through the upper tank and having its open end protected by the shell against the direct entrance of dusty air.

6. An automobile provided with a hood compartment having a cross flow radiator at the forward end equipped with an upper tank, an engine within the compartment provided with an air intake, and a conduit extending from the intake through the said tank and open for reception of fresh air at the front of the radiator, and a shell for the radiator having a portion extending down over said conduit but spaced therefrom to prevent the direct entrance of dusty air.

7. An internal combustion engine provided with angularly related cylinders, means for feeding fuel mixture to the cylinders comprising independent air and fuel mixing devices, and means for supplying air to said mixing devices including a common air inlet located at a distance from the mixing devices and separate conduits connected to the mixing devices and to the air inlet at a distance from its entrance so as to obtain ram action in feeding fuel to the cylinders.

8. A V type engine comprising angularly related banks of cylinders, means for feeding fuel mixture to the cylinders comprising independent air and fuel mixing devices, a common air intake above the cylinders and at a distance from the mixing devices, and separate extended conduits connected to the mixing devices and to the air inlet at a distance from its entrance so as to obtain ram action in feeding fuel to the cylinders.

9. An automobile having an internal combustion engine located in the usual hood compartment and a radiator at the forward end of the compartment, said engine having an air intake including an uninterrupted conduit having one end extending through the radiator and the other end directly connected to the engine, the first named end being provided with a shield to prevent the direct entrance of dust.

In testimony whereof I affix my signature.

CALEB E. SUMMERS.